3,527,786
FLUIDIZABLE ACRYLONITRILE CATALYTIC COMPOSITION AND PROCESS
Darrell W. Walker and Clifford E. Smith, Bartlesville, Okla., assignors to Phillips Petroleum Company, a corporation of Delaware
No Drawing. Filed July 6, 1967, Ser. No. 651,369
Int. Cl. C07c *121/04*
U.S. Cl. 260—465.3                        4 Claims

ABSTRACT OF THE DISCLOSURE

Charcoal impregnated with an alkali metal cyanide, an excellent catalyst for the synthesis of acrylonitrile from HCN and acetylene, but which is not operable in a fluidized bed in this reaction, is rendered fluidizable therein by mixing same with silica particles of a size in the range of 1 to 5,000 millimicrons to provide from 20 to 80 vol. percent of silica in the resulting mixture. The resulting catalyst mixture is used in a fluidized bed in the acrylonitrile synthesis.

---

This invention relates to a fluidizable charcoal-alkali metal cyanide-containing catalyst which is fluidizable in the synthesis of acrylonitrile from HCN and acetylene and to a process for effecting this synthesis with the catalyst.

The synthesis of acrylonitrile from HCN and acetylene utilizing alkali metal cyanide-on-charcoal catalyst is a conventional process. Such a catalyst is made by impregnating charcoal with a combination of NaCN and KCN, usually from an aqueous solution of these salts. A superior catalyst of this type is described in the copending application of C. E. Smith, Ser. No. 631,622, filed Apr. 18, 1967.

The acrylonitrile synthesis from acetylene and HCN is highly exothermic so that utilization of a fluid bed type reactor is highly desirable for a commercial process for heat exchange benefits. Charcoal-alkali metal cyanide catalysts have little utility in fluidized-bed synthesis of acrylonitrile in that a fluidized-bed of such a catalyst loses its fluidity after only a few minutes on stream because the catalyst becomes tacky. Variations of cyanide loading, temperature, and gas flow rates have been tried but none results in refluidization of the bed of charcoal particles. Other workers in the art have recognized this problem and various proposals have been made for mitigating the problem. For instance, U.S. Pat. 2,854,473 teaches that sea sand, caustic-treated sea sand, and sodium meta-silicate are suitable fluidizing agents. Others have tried other means of preventing loss of fluidization. For instance, U.S. Pat. 2,734,072 discloses that an alkali-metal treated, charcoal-supported catalyst in combination with alkali-metal treated supports of various kinds including silica, alumina, and other materials may be used as acrylonitrile catalysts in a fluidized bed system. We have tried such materials and none satisfactorily increases fluidization. Indeed, sodium meta-silicate actually decreases the fluidization time in most cases.

Accordingly, it is an object of the invention to provide a method for fluidizing particulate charcoal impregnated with one or more alkali metal cyanides in a reaction zone in which acrylonitrile is being synthesized from HCN and acetylene. Another object is to provide a mixture of fluidizable catalyst particles including charcoal impregnated with an alkali metal cyanide, which is maintainable in fluidized bed operation in the presence of HCN, acetylene, and acrylonitrile. A further object is to provide an improved method of synthesizing acrylonitrile from HCN and acetylene. Other objects of the invention will become apparent to one skilled in the art upon consideration of the accompanying disclosure.

In accordance with the invention, a catalyst is provided comprising particulate charcoal impregnated with at least one alkali metal cyanide in admixture with silica of a particle size in the range of 1 to 5,000 millimicrons, the catalyst having a particle size in the range of 40 to 450 mesh, the silica being in the range of 20 to 80 volume percent of the catalyst and the alkali metal cyanide being in the range of 0.5 to 50 weight percent of the catalyst. In one embodiment of the invention, the silica particles are deposited on the surfaces of the charcoal. In another embodiment, the silica particles are formed into separate agglomerates of 40 to 450 mesh size and the agglomerates contain at least one alkali-metal cyanide in the required amount (0.5 to 50 weight percent). Preferably, the agglomerates are formed by preparing a slurry or paste of the minute silica particles with an aqueous solution of the alkali-metal cyanide(s), drying the resulting paste, comminuting the dried material, and screening the comminuted material to provide the desired mesh size. The silica to be employed may be made by conventional methods, such as depolymerization of high purity sand to give soluble silicate, and subsequent repolymerization and precipitation of extremely fine particulate silica products. Alternatively, suitable silica products may be prepared by the vapor phase hydrolysis of a silicon compound, or suitable products can be made according to the teachings of U.S. Pats. 2,574,902 and 2,577,485 by forming low molecular weight silica particles in solution. Suitable commercial products are available under the trademark names Quso, Ludox, and Cab-O-Sil. Quso is a preferred silica product for use in the invention; however, other similar ultra-fine silica may be utilized. The silica utilized must have a particle diameter or size in the range of about 1 to about 5,000 millimicrons, this size designating the individual average size. The silicas do not necessarily exist in discrete particles, however, but can, and in most cases do, exist as agglomerates of the ultra-fine individual particles. In general, it is preferred to employ the silicas in the agglomerated form. The silica particles of our invention are believed to have a silica core with silanol groups and probably more or less tightly bound water near the surface of the particle. Quso, the presently preferred form is believed to comprise a silica core, a silica-silanol surface, hydrogen bonded water and adsorbed water, but we do not wish to be limited to any theory of structure. These silicas are characterized by having relatively high external surface area and low porosity as contrasted to silica gels which are porous and have mostly internal surface area. Silica gels, which are not suitable for use in the invention, are hard and granular while the silicas required are largely agglomerations of minute particles and are not hard and granular.

Silicas employed previously in the art are particles of silica per se, as opposed to agglomerates of silica particles. These prior art silica particles comprise a polymeric matrix of silica tetrahedrons of more or less uniform structure thruout. On the other hand, the silica agglomerates of the invention comprise numerous ultimate silica particles that adhere together. It is believed that such particles are cemented together by materials functioning as adhesives such as sodium silicate or alkali metal salts such as NaCN or KCN. At the adjoining surfaces of such particles, there is believed to be a surface of silanol groups, and possibly a surface of associated water molecules. Such polar surfaces are believed to be held together also by cohesive attraction of one such surface for another. In any event, forces weaker than those bonding the polymeric matrix of silica tetrahedrons are operative to adhere the particles of the agglomerate, and such agglomerates are not comprised of continuous silica tetrahedron chains, as are silica particles per se. Neither are the particles adhered as weakly as in agglomerates formed spontaneously in ultra-fine silica dust. Although the said agglomerates may be of the same size as large silica particles when determined by sieving or the like, such agglomerates are inherently different from silica particles per se; in a sense, as different as mud balls are from gravel. In other words, mud balls can be made up of small particles of substantially the same substance as gravel, and may be the same size, however, there obviously are inherent differences. In like manner, there are inherent differences between the silica agglomerates of the instant invention and the silica particles, per se, employed by the prior art, although both can admittedly be of the same size.

To illustrate the point further, what is known to the art as finely-divided silica, that is, silica particles of 62 microns in diameter, but preferably 74 to 149 microns in diameter, as disclosed in U.S. Pat. 2,854,473 to be treated with alkali metal salts and employed to fluidize an alkali-on-charcoal catalyst of similar particle size are not operable for a sufficient period to be practical. Data presented herein below clearly demonstrate such silica particles to be ineffective in effecting fluidization of the charcoal catalyst in an ambient gas including HCN, acetylene, and acrylonitrile for any substantial period. On the other hand, agglomerates of silica particles of minute size that have been treated with the alkali metal salts are demonstrated to be very effective for fluidization of the charcoal catalyst in this same ambient.

The silicas of the instant invention are characterized by having relatively high external surface area and low porosity as contrasted to silica gels which are porous and have mostly internal surface area. The ultra-fine silica particles have a higher external surface area for a given volume than the larger particles of silica gel in the same manner that a given volume of BB shot has a higher external surface area than a given volume of golf balls. On the other hand, the relatively large particles of silica gel, being more or less porous like a sponge, have a relatively high internal surface area. The respective external and internal surface areas have been determined and conform to the above relationship predicted by theory. If silica gel particles could be reduced to the size of the silica particles required in the instant invention, they would also be suitable for effecting the required suspension or fluidization. It is not known whether silica gel particles could be reduced to this size and still retain their nature as silica gels. If such reduction in size could be made, there appears to be no reason why silica gel particles of this size would not be satisfactory if agglomerated and employed according to the process of the invention. Also, it is probable that sea sand, if reduced to the ultimate particle size required and then treated with alkali metal salts and agglomerated, would function in accordance with the invention.

The amount of silica of ultra-fine particle size employed in the catalyst composition is in the range of 20 to 80, preferably, 40 to 60 volume percent of the composition. The amount of alkali metal compound employed in the composition is in the range of 0.5 to 50, preferably, 5 to 30 weight percent of the composition. The alkali metal compounds are deposited or admixed with both the charcoal and the silica particles.

An oxide of an alkaline earth metal may be incorporated in the charcoal, in the fine silica or agglomerates thereof, or in both the charcoal and the silica. It is also feasible to incorporate in the catalytic composition separate agglomerates of the alkaline earth metal oxide of suitable particle size (40–450 mesh). The amount of alkaline earth metal oxide employed is in the range of 0.1 to 10, preferably, 0.5 to 4 volume percent of the composition.

Any conventional charcoal-alkali metal cyanide catalyst may be used for the charcoal portion of the mixture. To illustrate, a solution of KCN and NaCN in water may be used to impregnate the charcoal after which it is dried and ground to suitable fluidization size. A particularly suitable charcoal catalyst is prepared in accordance with the aforesaid copending application. The impregnating solution may comprise alkali metal carbonates, hydroxides, and the like, the impregnation being followed by conversion of the alkali metal compound to the corresponding cyanide by methods known in the art.

The equipment to be utilized in effecting the acrylonitrile synthesis, as well as reaction rates, linear gas velocities, pressures, times of contact, recycles, and the like, are those conventionally utilized in acrylonitrile synthesis from HCN and acetylene. The mesh size of the catalyst particles in the composite is in the range of 50 to 450 (U.S. screen size). A temperature in the range of about 650 to 1200° F. and any convenient pressure, including atmospheric, are suitable in the process. High gaseous hourly space velocities promote the desired reaction to some degree, but at the expense of lower conversion of the feed materials. Generally, however, the gaseous hourly space velocity utilized is in the range of about 50 to 3000 v./v./hr. The ratio of hydrogen cyanide to acetylene in the feedstream may vary over a wide range but generally approximates the stoichiometric proportions. An excess of acetylene is sometimes beneficial. Other gases such as hydrogen or inert gases such as nitrogen can also be present in the feedstream. Optimums of process variables can readily be determined by one skilled in the art for a particular situation.

The examples presented below clearly demonstrate the value and operability of the invention but are not to be construed as unnecessarily limiting the invention.

Conventional alkali-on-charcoal catalysts for acrylonitrile production were prepared by soaking "Chief Chetopa" charcoal (a common cook-out type charcoal in briquet form from hardwoods such as oak, maple, and the like) that had previously been ground and sieved to either 40–80 or 100–200 mesh size (U.S. sieve) in aqueous solutions of NaCN and KCN (equal weight amounts). The solutions were of such strength and the soakings were for such times as to impart loadings of cyanide salts on the charcoal as are indicated. Loadings of cyanide salts are expressed thus: total wt. of NaCN+KCN (100)/wt. of cyanide salts+charcoal. After soaking, the alkali-on-charcoal catalysts were dried in a vacuum oven.

Various silica fluidization aids of this invention and silica gels of the prior art were treated with NaCN and KCN. The cyanide mixture (equal weight amounts of KCN and NaCN) was dissolved in water and the solution was added to the silica or silica gel in sufficient amounts to effect the loadings noted. The cyanide treated materials were then dried in a vacuum oven, ground, and screened to selected mesh sizes. In certain cases, CaO was also incorporated in the fluidization aid.

EXAMPLE 1

To a 1-inch diameter, quartz, upflow, fluidized bed type reactor in each run was charged 30–50 cc. of each of the catalytic compositions, the charcoal being of 40–80 mesh. The catalytic compositions were then activated in a stream of 10% HCN and 90% $H_2$ (vol. percents) at 1050° F. for about 60 minutes prior to the initiation of each run. To the reactor of each run was then passed a feed gas stream comprised of 10% acetylene, 10% HCN, and 80% hydrogen percent at selected linear gas velocities for fluidization. Reaction temperature was 1050° F. in each run. Fluidization times were noted, i.e., the time beween the start of the run and the time that the catalytic composition failed to fluidize. Pertinent data are summarized in the following table:

This example demonstrates that silica gels are not suitable as fluidization aids whether treated with CaO or not. If further demonstrates that other silicas, as defined in this invention, are also suitable.

Certain modifications of the invention will become apparent to those skilled in the art and the illustrative de-

TABLE I

| Fluidization aid | Percent fluidization aid of catalytic composition (vol.) | Percent NaCN-KCN on charcoal (wt.) | Fluidization micron size | SiO₂ micron particle size | Linear gas vel. in/sec. | Fluidization time |
|---|---|---|---|---|---|---|
| 18% NaCN-KCN [1]+2% CaO on Quso G-30 [2] silica product. | 50 | 8.0 | 74-149 | 1.7 | 2.5 | 9.0 hrs.[3] |
| 20% NaCN-KCN on Quso G-30 silica product. | 50 | 8.0 | 177-420 | 1.7 | 2.9 | 3.5 hrs. |
| None | 0 | 17.5 | | | 7.35 | 4 min. |
| Sea sand | 40 | 17.5 | 74-149 | 74-149 | 7 | 1 min. |
| Sea sand with 0.2% NaOH | 40 | 12.5 | 74-149 | 74-149 | 4.3 | 4 min. |
| Sea sand with 0.2% NaOH | 40 | 8.0 | 74-149 | 74-149 | 4 | 3 min. |
| Sodium meta silicate | 50 | 8.0 | 74-149 | 74-149 | 8 | 0.[4] |

[1] The percent of NaCN-KCN and CaO is on a weight basis based on the entire silica fluidization aid. Quso G-30 is a trademark for a micro fine precipitated silica produced by a process involving depolymerization of high purity sand to give a soluble silicate and subsequent treatment to cause repolymerization and precipitation of an extremely particulate silica in the form of loose agglomerates of extremely small ultimate particles with low porosity and high available external surface area. The particles are about 1.7 microns average diameter.
[2] Trademark.
[3] The composition was still fluidizing when the reactor was shut down.
[4] The materials stopped fluidizing immediately upon introduction of the reactive feed gas.

This example clearly demonstrates that the silica fluidization aids of this invention effect excellent fluidization of an alkali-on-charcoal catalyst. It further demonstrates that CaO promotes fluidization even more effectively. Also clearly demonstrated is the fact that prior art fluidization aids such as sea sand, alkalized sea sand, or sodium meta silicate are of little or no value.

EXAMPLE 2

To an 8 mm. diameter, quartz, upflow, fluidized bed type reactor in each run was charged 1 cc. of each of the catalytic compositions, the charcoal being 100 to 200 mesh and containing 8 wt. percent NaCN-KCN (equal amounts). The catalytic compositions were then activated in a stream of 10% HCN and 90% H₂ (vol. percents) at 1050° F. for about 60 minutes prior to the initiation of each run. To the reactor of each run was then passed a feed gas stream comprising 10% acetylene, 10% HCN, and 80% hydrogen (vol. percents). The linear gas velocity in each run was 1.25 inches per second. Reaction temperature was 1050° F. in each run. Fluidization times were noted, i.e., the time between the start of the run and the time that the catalytic composition failed to fluidize. Pertinent data are summarized in the following table:

tails disclosed are not to be construed as imposing unnecessary limitations on the invention.

We claim:
1. In a process for synthesizing acrylonitrile by passing a mixture of gaseous HCN and C₂H₂ upwardly through a catalyst composed of particulate charcoal impregnated with at least one alkali metal cyanide in admixture with silica at fluidizing velocity under reaction conditions which form acrylonitrile the improvement comprising maintaining a fluidized bed of said catalyst by employing a particular silica having a particle diameter in the range of about 1 to 5000 millimicrons, wherein said silica particles are deposited on said charcoal or said silica particles are formed into separate agglomerates wherein said agglomerate and said impregnated charcoal admixture is of a 40–450 mesh size, wherein said silica being in the range of 20 to 80 volume percent of said catalyst, and said alkali metal cyanide being in the range of about .5 to 50 weight percent of said catalyst.

2. The process of claim 1 wherein said silica is in the range of 40 to 60 vol. percent of the catalyst and said alkali metal cyanide is in the range of 5 to 30 wt. percent.

3. The process of claim 1 wherein said silica is in the form of separate agglomerates containing said cyanide.

TABLE II

| Fluidization Aid | Percent fluidization aid of catalytic composition (vol.) | Fluidization aid, micron size | SiO₂ micro particle size | Fluidization time |
|---|---|---|---|---|
| 18% NaCN-KCN [1] + 2% CaO on Quso G-30. | 50 | 177-420 | 1.7 | 3.75 hrs. |
| Ludox [2] LS [5] Silica | ([6]) | ([6]) | .007-1.5 | 1.00 hr. |
| 18% NaCN-KCN [7] on Cab-O-Sil | 50 | 177-420 | .015-.02 | 1.67 hr. |
| 18% NaCN-KCN [8] + 2% CaO on Sargent Silica Gel | 50 | 74-149 | 74-149 | 3 min. |
| 18% NaCN-KCN [8] on Fisher Silica Gel | 50 | 74-149 | 74-149 | 0.([4]) |
| None | 0 | | | 0.([4]) |

See footnotes 1, 2, 3, and 4 at end of Table I.
[5] Ludox LS silica is a trademark for finely divided colloidal silica product prepared according to teachings of U.S. 2,574,902 and U.S. 2,577,485.
[6] This catalytic composition was prepared by dissolving sufficient KCN-NaCN in the colloidal mixture of the silica to provide 8.0 wt. % of the charcoal, and then adding the KCN-NaCN-silica composition to the charcoal in sufficient quantity to provide 1 part by weight of silica for each part by weight of charcoal. The composition was dried, ground and screened before use.
[7] Cab-O-Sil is a trademark for a finely divided (15 to 20 millimicrons) silica prepared by the vapor phase hydrolysis of a silicon compound.
[8] Sargent and Fisher silica gels are silica gels provided by these respective supply houses.

4. The process of claim 1 wherein said silica is deposited on the surfaces of said charcoal.

References Cited

UNITED STATES PATENTS

| | | | |
|---|---|---|---|
| 2,413,496 | 12/1946 | Green et al. | 260—465.3 |
| 2,419,186 | 4/1947 | Harris et al. | 260—465.3 |
| 2,734,072 | 2/1956 | Harris | 260—465.3 |
| 2,854,473 | 9/1958 | Spaulding et al. | 260—465.3 |

JOSEPH P. BRUST, Primary Examiner

U.S. Cl. X.R.

252—438